United States Patent
Gomez et al.

(10) Patent No.: US 10,513,208 B2
(45) Date of Patent: Dec. 24, 2019

(54) VEHICLE SEAT WITH ARMREST

(71) Applicant: Adient Engineering and IP GmbH, Burscheid (DE)

(72) Inventors: John Gomez, Howell, MI (US); Kurt Seibold, Farmington Hills, MI (US); Mark Milner, Bingham Farms, MI (US)

(73) Assignee: Adient Engineering and IP GmbH, Burscheid (DE)

( * ) Notice: Subject to any disclaimer, the term of this patent is extended or adjusted under 35 U.S.C. 154(b) by 24 days.

(21) Appl. No.: 15/846,786

(22) Filed: Dec. 19, 2017

(65) Prior Publication Data

US 2019/0184875 A1 Jun. 20, 2019

(51) Int. Cl.
| | |
|---|---|
| *B60N 2/75* | (2018.01) |
| *B60N 2/22* | (2006.01) |
| *B60N 2/02* | (2006.01) |
| *B60N 2/14* | (2006.01) |
| *B60N 2/806* | (2018.01) |

(52) U.S. Cl.
CPC ........... *B60N 2/767* (2018.02); *B60N 2/0232* (2013.01); *B60N 2/14* (2013.01); *B60N 2/22* (2013.01); *B60N 2/806* (2018.02)

(58) Field of Classification Search
CPC .......... B60N 2/0232; B60N 2/14; B60N 2/22; B60N 2/767
USPC ... 297/78, 325, 330, 344.23, 354.12, 411.39, 297/411.35, 411.38
See application file for complete search history.

(56) References Cited

U.S. PATENT DOCUMENTS

| | | | | |
|---|---|---|---|---|
| 2,085,836 A | * | 7/1937 | Tatum ................... | B60N 2/767 297/411.39 |
| 3,089,741 A | * | 5/1963 | Burton .................. | A61G 15/00 297/78 X |
| 3,134,623 A | * | 5/1964 | Pini ........................ | A47C 1/036 297/78 |
| 3,381,997 A | * | 5/1968 | Fritz .................... | A47C 1/0242 297/78 X |
| 3,486,789 A | * | 12/1969 | Cahlik ..................... | A47C 1/03 297/78 X |
| 3,910,632 A | | 10/1975 | Marechal | |
| 4,097,088 A | * | 6/1978 | Meiller .................... | B60N 2/77 297/411.38 |
| 4,165,901 A | | 8/1979 | Swenson et al. | |
| 4,400,033 A | * | 8/1983 | Pietsch ................... | A47C 1/03 297/411.39 X |

(Continued)

FOREIGN PATENT DOCUMENTS

WO 2017060313 A1 4/2017

*Primary Examiner* — Rodney B White
(74) *Attorney, Agent, or Firm* — McGlew and Tuttle, P.C.

(57) ABSTRACT

A vehicle seat is provided including a seat base, a seatback and a seatback recline pivot pivotably supporting the seatback relative to the seat base for pivoting movement of the seatback relative to the seat base about the seatback recline pivot, between a full upright position and a full recline position. An armrest is provided having an upper armrest upper surface. An armrest to seatback recline pivot connection pivotably connects the armrest to the seatback recline pivot for pivoting movement of the seatbackarmrest relative to the seat base about the seatback recline pivot, between an armrest full upright position and an armrest full recline position.

19 Claims, 6 Drawing Sheets

(56) References Cited

U.S. PATENT DOCUMENTS

| | | | | |
|---|---|---|---|---|
| 4,466,664 | A * | 8/1984 | Kondou | B60N 2/767 297/411.39 |
| 4,492,407 | A * | 1/1985 | Broadhead | A61G 15/02 297/78 X |
| 4,541,671 | A * | 9/1985 | Broadhead | A61G 15/02 297/330 |
| 4,711,486 | A * | 12/1987 | Fujiyama | A47C 1/06 297/330 |
| 4,802,706 | A * | 2/1989 | Onimaru | B60N 2/0224 297/344.23 X |
| 4,968,095 | A * | 11/1990 | Moyer | B60N 2/767 297/411.39 |
| 4,978,170 | A * | 12/1990 | Pelz | B60N 2/767 297/411.39 |
| 6,168,234 | B1 * | 1/2001 | Haynes | B60N 2/143 297/344.23 X |
| 6,212,713 | B1 * | 4/2001 | Kuck | A47C 20/041 297/411.39 X |
| 6,238,002 | B1 * | 5/2001 | Brewer | B60N 2/753 297/411.39 X |
| 6,361,114 | B1 * | 3/2002 | Rumler | A47C 7/543 297/411.39 |
| 6,572,172 | B1 * | 6/2003 | Ninomiya | B60N 2/0232 297/344.23 X |
| 6,715,836 | B1 * | 4/2004 | Chen | A47C 7/543 297/411.39 |
| 6,948,776 | B1 * | 9/2005 | Harmon | B60N 2/01 297/411.39 |
| 7,182,404 | B2 * | 2/2007 | Laurent | B60N 2/34 297/411.39 |
| 7,967,386 | B2 * | 6/2011 | Na | B60N 2/206 297/411.39 X |
| 8,220,856 | B2 * | 7/2012 | Horiguchi | B60N 2/14 297/344.23 X |
| 8,328,286 | B2 * | 12/2012 | Steury | B60N 2/22 297/411.39 |
| 8,827,367 | B2 * | 9/2014 | Hibi | B60N 2/0232 297/330 |
| 8,967,722 | B2 * | 3/2015 | Neterer | A47C 7/54 297/411.39 X |
| 2007/0164592 | A1 * | 7/2007 | Gerhardt | B60N 2/0232 297/344.23 |
| 2012/0153697 | A1 | 6/2012 | Hibi | |
| 2014/0225410 | A1 * | 8/2014 | Thurow | B60N 2/22 297/411.39 X |
| 2015/0375865 | A1 | 12/2015 | Fischer et al. | |
| 2017/0079434 | A1 | 3/2017 | Paul et al. | |
| 2018/0015854 | A1 * | 1/2018 | Song | B60N 2/767 |
| 2018/0281623 | A1 | 10/2018 | Matsumoto et al. | |

* cited by examiner

VEHICLE SEAT WITH ARMREST

FIELD OF THE INVENTION

The present invention relates to vehicle seats in general and more particularly to a vehicle seat with an armrest and a vehicle seatback, pivot and armrest assembly.

BACKGROUND OF THE INVENTION

Vehicle seats are often provided that are associated with one or more armrests. The armrests may be provided at an inner surface of a door of the vehicle. Further armrests may be provided that pivot so as to move to a storage position. Such an armrest may have a lower surface which forms a part of a seatback (also known as backrest) in a rear bench seat, at a vehicle wall or bulkhead. Although an independently pivoting armrest, at such rear bench seats, provides some advantages relating to storage, such armrests may not provide optimal comfort for the passenger. Further, for front seat passengers, armrest options are significantly restricted by issues relating to access to functional items as well as issues relating to vehicle ingress and egress.

SUMMARY OF THE INVENTION

It is an object of the invention to provide a position adjustable vehicle seat with at least one armrest which provides optimal comfort for the passenger through a full range of seat positions.

It is an object of the invention to provide a position adjustable vehicle seat with armrests that are fixed to the recline pivot of the seat rather than the seatback or cushion structure and which armrests move with the occupant as the seat reclines.

It is a further object of the invention to provide a position adjustable vehicle seat with at least one armrest which does not require much or any storage space but which in combination with vehicle seat features does not significantly obstruct or hamper ingress into the vehicle seat and egress from the vehicle seat.

It is a further object of the invention to provide a position adjustable vehicle seat with at least one armrest which can provide the occupant support (as a hand grip or hand support surface) for ingress into the vehicle seat and egress from the vehicle seat.

According to the invention, a vehicle seat is provided comprising a seat base, a seatback and a seatback recline pivot pivotably supporting the seatback relative to the seat base for pivoting movement of the seatback relative to the seat base about the seatback recline pivot, between a full upright position and a full recline position. An armrest is provided having an upper armrest upper surface. An armrest to seatback recline pivot connection pivotably connects the armrest to the seatback recline pivot for pivoting movement of the seatback relative to the seat base about the seatback recline pivot, between an armrest full upright position and an armrest full recline position.

The armrest advantageously comprises an armrest upper portion with an armrest upper rear end. The armrest extends from the armrest upper rear end to an armrest upper forward end. The upper armrest surface is defined by the armrest upper portion between the armrest upper rear end and the armrest upper forward end. The armrest further comprises an armrest lower portion having an armrest lower rear end, with the armrest to seatback recline pivot connection at the armrest lower rear end. The armrest further comprises a joining portion, joining the armrest upper portion with the armrest lower portion.

The armrest may be connected to the seatback at other locations. An armrest to seatback connection may also fix the armrest to the seatback at a connection location. The connection location may be spaced from the armrest to seatback recline pivot connection. For example the armrest to seatback connection location may be at the armrest upper rear end.

The armrest may pivot with the seatback to position the armrest upper surface at a design position armrest angle of from 10° to 0° below horizontal, with the seatback in a seatback design position between the seatback full upright position and the full recline position. The armrest pivots with the seatback to position the armrest upper surface at a full recline armrest angle of from 0° and 20° above horizontal, with the seatback in the full recline position. The armrest pivots with the seatback to position the armrest upper surface at a full upright armrest angle of from 5° and 25° below horizontal, with the seatback in the full upright position. The armrest may also be supported at the recline pivot to pivot independently of the seatback. This may allow a positioning of the armrest upper surface at armrest angle of from 0° and 20° above horizontal and from 0° to 25° below horizontal.

The vehicle seat may include a headrest assembly comprising a headrest and supports connected to a rear facing portion of the backrest.

The vehicle seat may further comprise a rotational connection of the seat base with a vehicle floor and a rotational drive for rotating the vehicle seat relative to the seat.

A positioning system is preferably provided comprising an actuator, a plurality of motors and an operative connection between the actuator and the plurality of drive motors. The plurality of motors advantageously comprises the rotational drive and at least a seatback pivot drive for changing a pivot angle of the seatback between the seatback full upright position and the full recline position.

The plurality of drive motors may further comprise a seat base position adjustment drive adjusting a position of the seat base. The plurality of motors may further comprise an armrest pivot drive to pivot the armrest about the seatback recline pivot to select an angular position of the armrest surface of the armrest. Other positioning motors may be provided as discussed below.

The actuator may further comprise an actuator interface connected to the armrest. The actuator may further comprise an actuator interface provided as a computer application on a computer or mobile device and connected to the drive motors via the operative connection.

The vehicle seat positioning system establishes and executes a sequenced set of specified seat movements that rotate and position the seat to predefined positions based on movements of a plurality of drive motors including the rotational drive.

The invention provides particular advantages in cooperation with a seat controller and powered position system that uses user specified pre-sets to provide sequencing of an optimal ingress/egress. The presets specified may include user keying in the amount of:
 rotation up to 90 degrees from zero (preferably the zero position is the forward travel direction with an optimal rotation being about 70 degrees from zero
 track position up to full forward
 up to full down tilt
 upright seatback angle, etc.

Sequenced sets of specified seat movements that rotate and position the seat for getting in and out of the vehicle easier is particularly advantageous with the armrest configuration according to the invention. The seat greets the occupant with their own personal pre-sets. In particular, door sensors detecting the state of any one of the doors of the vehicle may be coordinated with adjacent seats whereby the opening of the door initiates the sequence to provide the seat in a preselected and defined ingress and egress position.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figures 1, 2, 3:
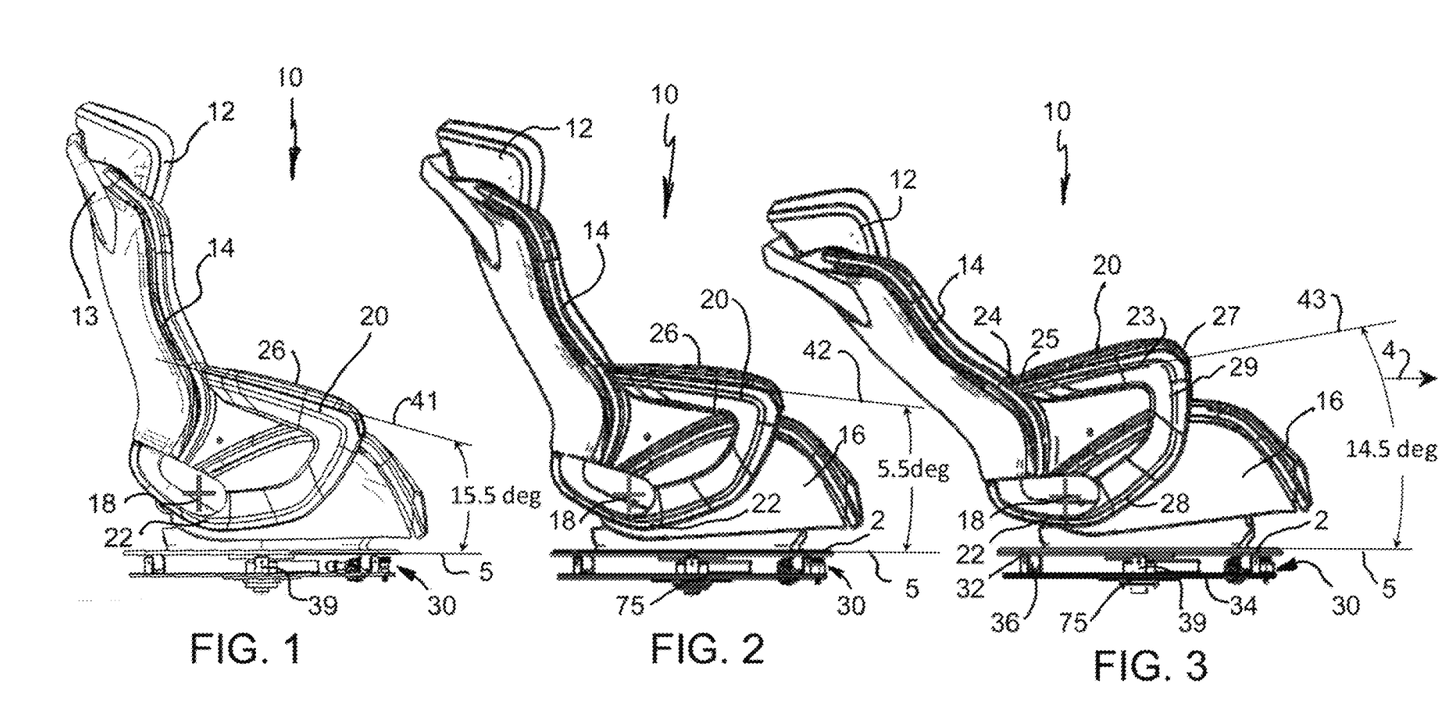
FIG. 1 is a side view showing a vehicle seat according to the invention in a full upright position.
FIG. 2 is a side view showing the vehicle seat in a design position (an expected preferred use position)
FIG. 3 is a side view showing the vehicle seat in a full recline position.
Figure 4:
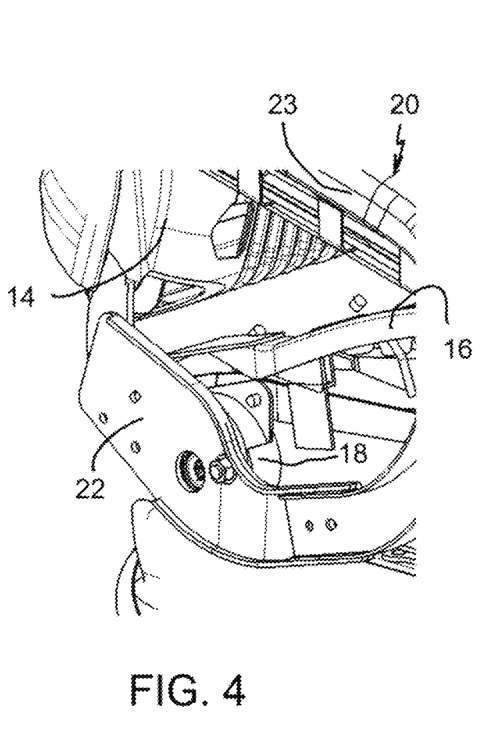
FIG. 4 is a perspective detail view of the vehicle seat with the trim and foam removed and showing the armrest to recline pivot connection.
Figure 5:
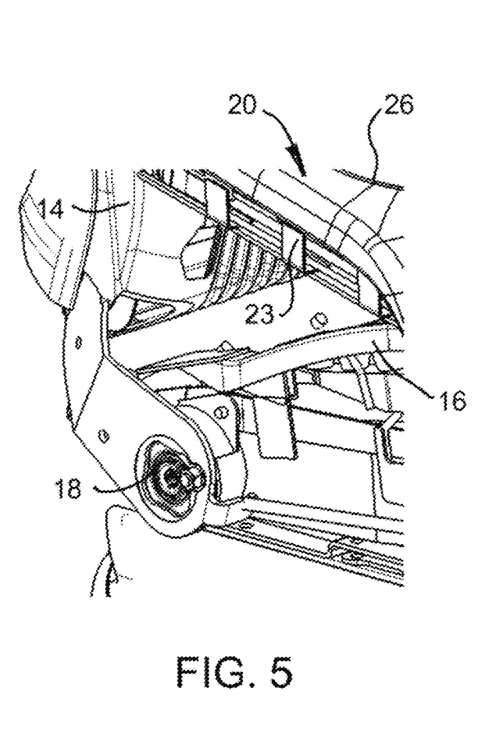
FIG. 5 is a perspective detail view of the vehicle seat with the trim and foam removed, in a manner similar to FIG. 4, and with a lower part of the armrest removed and showing a seatback to recline pivot connection.
Figure 6:
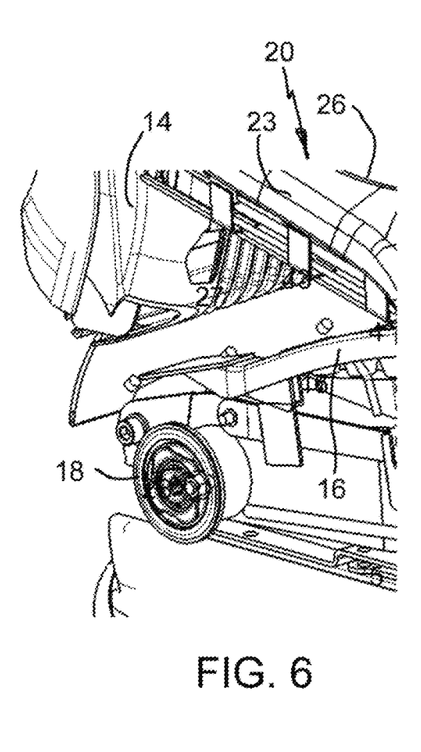
FIG. 6 is a perspective detail view of the vehicle seat with the trim and foam and with the lower part of the armrest removed, in a manner similar to FIG. 5, and with seatback connection removed and showing the recline pivot.

Referring to the drawings in particular, FIGS. 1-3 show a vehicle seat generally designated 10, respectively in a full up position, a design position and a full recline position. The vehicle seat 10 includes a headrest assembly 12 with headrest supports 13, a seatback 14, and a seat base (cushion) 16. The seatback 14 is connected to the seat base 16 by a seatback recline pivot 18. The seatback pivot 18 may be a manually actuatable fitting and is preferably a motorized pivoting connection (seatback pivot of FIG. 6) for a motorized pivoting the seatback 14 relative to the seat base 16. FIG. 5 shows the recline pivot 18 supported with the seat base 16 and connected to seatback 14. The vehicle seat 10 further comprises armrests 20 at each side of the vehicle seat 10. The armrests are connected to pivot 18 at armrest pivot connections 22 as shown in FIG. 4. Each armrest 20 is fixed by the armrest pivot connection 22 to the recline pivot 18 for pivoting about a pivot axis defined by the recline pivot 18. This recline pivot connection supports the armrest 20 rather than the armrest 20 being fixed to the seatback structure 14 or being fixed to the seat base (cushion) structure 16. In the embodiment shown, each armrest 20 is fixed relative to the seatback 14 for pivoting movement with the seatback 14 about the recline pivot 18. This is provided with the pivot connection 22 fixed to the connection of the seatback 14 to the recline pivot. A further upper connection—an armrest to seatback connection 24—may be provided for further supporting and fixing the armrest 20 to the seatback 14 at a seatback connection 24 at a connection location, which connection location is spaced from the armrest to seatback recline pivot connection 22. However, the armrest 20 may be only supported at the pivot connection 22. In this case an armrest upper rear end 25 is adjacent to but not directly supported at the backrest 14 as shown in FIGS. 1-3. Further, an alternate embodiment may be provided by with the armrest 20 pivoting about the recline pivot 18 independently of the seatback 14. This involves disconnecting the pivot connection 22 from the seat back pivot connection. This further provides the further alternative embodiment with the motion of the armrest 20 being motor driven for selective program pivoting movement of the armrest 20 about the recline pivot 18.

Figure 15:
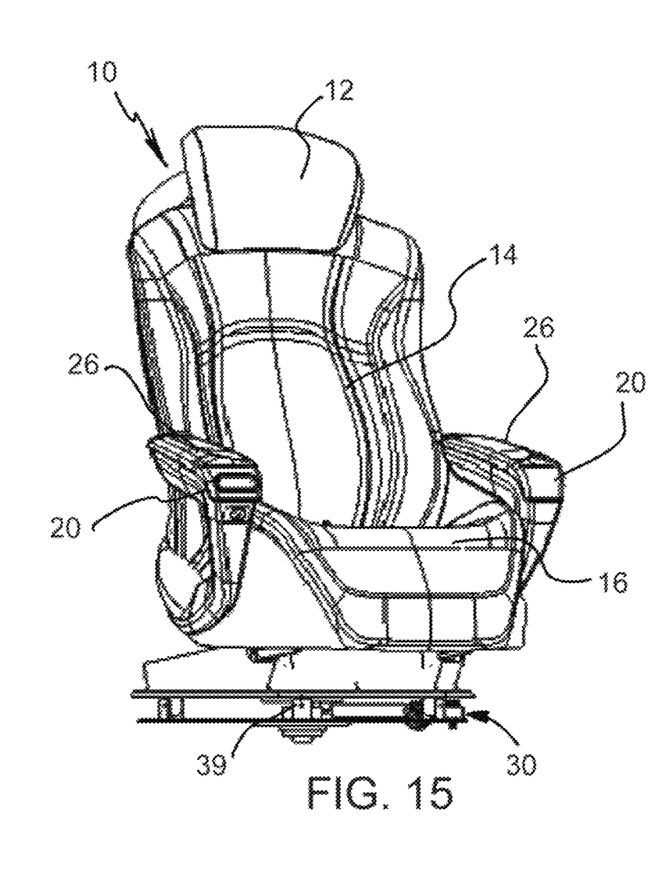
FIG. 15 is a perspective view showing the vehicle seat in an adjusted position of the sequence user selected (optimal ingress/egress position) selected by the user to be saved for future use.

The embodiment of FIG. 4 provides a connection of the armrest 20 to the seatback 14 at a location adjacent of the pivot connection 22, adjacent to the recline pivot 18. This configuration sets an angular position of an upper surface 26 of the armrest 20, relative to the recline angle of the seatback 14. The upper surface 26 has a full up armrest angle 41, a design armrest angle 42 and a full recline armrest angle 43. As can be seen in FIG. 1, in the full upright position of the seatback 14, the surface 26 has a full upright armrest angle 41 set at an angle of 15.5° below horizontal (a downward angle of 15.5° relative to horizontal) 5. This full upright armrest angle 41 is considered to be particularly advantageous with regard to ingress and egress, particularly if the vehicle seat 10 is rotated from a forward facing (zero) position—direction of travel 4—or from any other position, to an optimal ingress/egress position (FIG. 15). The armrests 20 provide the occupant support (as a hand grip or hand support surface) for ingress into the vehicle seat and egress from the vehicle seat while not being in the way as to seat access. The full upright armrest angle 41 should be between 5° and 25° below horizontal and advantageously be between 12° and 19° below horizontal and preferably be in a range from 14° to 17° below horizontal.

FIG. 2 shows the vehicle seat 10 with the seatback 14 in the design position. This provides an advantageous recline angle of the seatback 14. Based on a preferred use or design position angle of the seatback 14, the upper surface 26 of the armrest 20 has a design armrest angle 42 that is preferably at 5.5° below horizontal (slightly sloping down from elbow toward palm with an occupant resting an arm on the surface 26). It is believed that an angle slightly below horizontal is particularly advantageous. This set design position of the upper surface armrest angle 42 may be between 0° and 10° below horizontal and advantageously is between 4° and 7° below horizontal and preferably is in a range from 5° to 6° below horizontal.

FIG. 3 shows the vehicle seat 10 with the seatback 14 in the full recline position. With the angle of the surface 26 of the armrest 26 fixed relative to the recline angle of the backrest 14, the full recline armrest angle 43 of the surface 26 is advantageously 14.5° above horizontal. This set, full recline armrest angle 43 may be between 0° and 20° above horizontal and advantageously the full recline armrest angle 43 is between 10° and 18° above horizontal and preferably the full recline armrest angle 43 is in a range from 14° to 15° above horizontal. However, the alternate embodiment of the invention, wherein the armrest 20 is pivotably movable about the recline pivot 18 independently of the pivoting of the seatback 14 (or at least with an armrest angle that is somewhat adjustable—withing a range—relative to the angular position of the seatback 14), allows various backrest angle and armrest angle combinations, including a downwardly sloping angle of the upper surface 26 of the armrest 20 with the seatback 14 in the full recline position.

The armrest 20 advantageously comprises an armrest upper portion 23 with the armrest upper rear end 25. The armrest 20 extends from the armrest upper rear end 25 to an armrest upper forward end 27. The upper armrest surface 26 is defined by the armrest upper portion 23 between the armrest upper rear end 25 and the armrest upper forward end 27. The armrest further comprises an armrest lower portion 28 with the armrest to seatback recline pivot connection 22 at an armrest lower rear end. The armrest comprises a joining portion 29, joining the armrest upper portion 23 with the armrest lower portion 28, that has the seatback recline pivot connection 22.

The vehicle seat 10 is advantageously supported relative to the vehicle with a rotational mount 30. The rotational mount 30 may comprise support track openings 32 provided in a floor 2 of the motor vehicle 8. A subfloor 34 may support a rotational position motor 75. The seat base (cushion) 16 includes supports 36 that rotate on or relative to subfloor 34 and are driven for movement along the path of the track openings 32. This allows selective rotational positioning of the vehicle seat 10 about an axis 39 of the rotational position motor 75, between a forward facing position (based on a direction of travel 4) and any other rotational position relative to the forward facing position.

Figure 7:
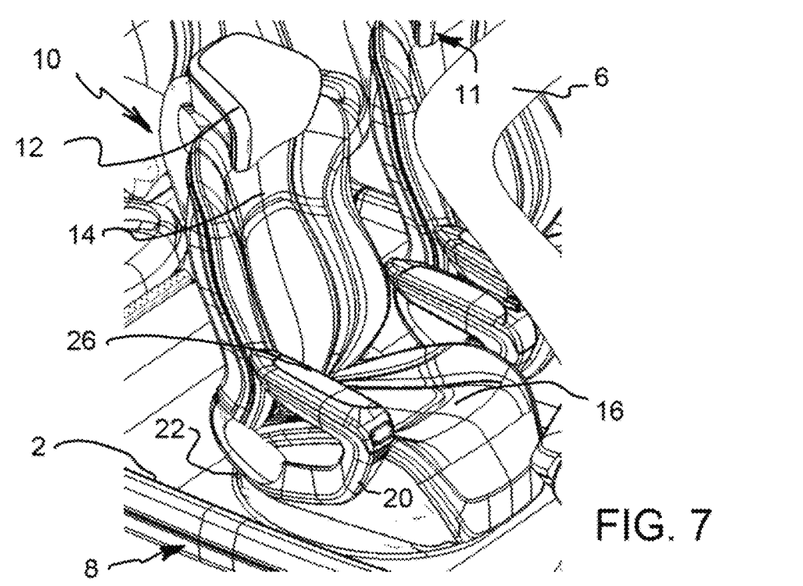
FIG. 7 is a view of the vehicle seat positioned as a first row vehicle seat.

FIG. 7 shows the vehicle seat 10 in a vehicle 8 and in a design position relative to the vehicle floor 2 of the vehicle 8. In this embodiment, the vehicle seat 10 is a front passenger seat but the vehicle seat 10 could also be a rear seat as well as an essentially identical front driver seat 11. As shown, the vehicle 8 includes a front windshield frame 6, supporting a windshield. The vehicle 8 includes a door opening which is shown for any typical or known vehicle door (not shown). For example, the vehicle door may be a traditional front hinge door, a rear hinge door (suicide door), a sliding door that slides forward and aft with respect to a direction of travel, a gull-wing door or other known door configurations. As shown, the windshield frame 6 is at the front of the vehicle 8. The vehicle seat 10 is shown in a forward facing (zero) position (with regard to a direction of travel 4 as indicated in FIG. 3). From this position or any position including the full recline position, the vehicle seat 10 may be moved to the full upright position such that the upper surface 26 of the armrest 20 slopes downwardly to a greater extent. This facilitates ingress and egress through a door opening of the vehicle 8.

Advantageously the vehicle seat includes a powered positioning system 50 such that the vehicle seat 10 can be adjusted in numerous ways to achieve various positions for comfort or functional purposes. The movement advantageously includes combined movements including rotation of the vehicle seat 10 by the rotational connection 30 and rotational drive 75. The positioning system 50 includes a plurality of drive motors 71($M_1$), 72($M_2$), ... 79($M_n$) effecting the position changes. One such motor is a recline motor 74 for controlled movement of the seatback 14 relative to the recline pivot 18 and relative to the seat base 16. Another of the drive motors 40 is the already described rotational position motor 75. The seat cushion 16 may be mounted for positional adjustment including for a pivotable movement with this movement driven by a seat base pivot drive. The drive motors 71, 72, 73 may also be provided for changing the position of the headrest 12 (height position, position in the four-aft direction and angular tilt position). Additionally, an armrest pivot drive motor 79 ($M_n$) and drive connection may be provided to reposition the angle of the surface 26 of the armrest 20.

Figure 8:
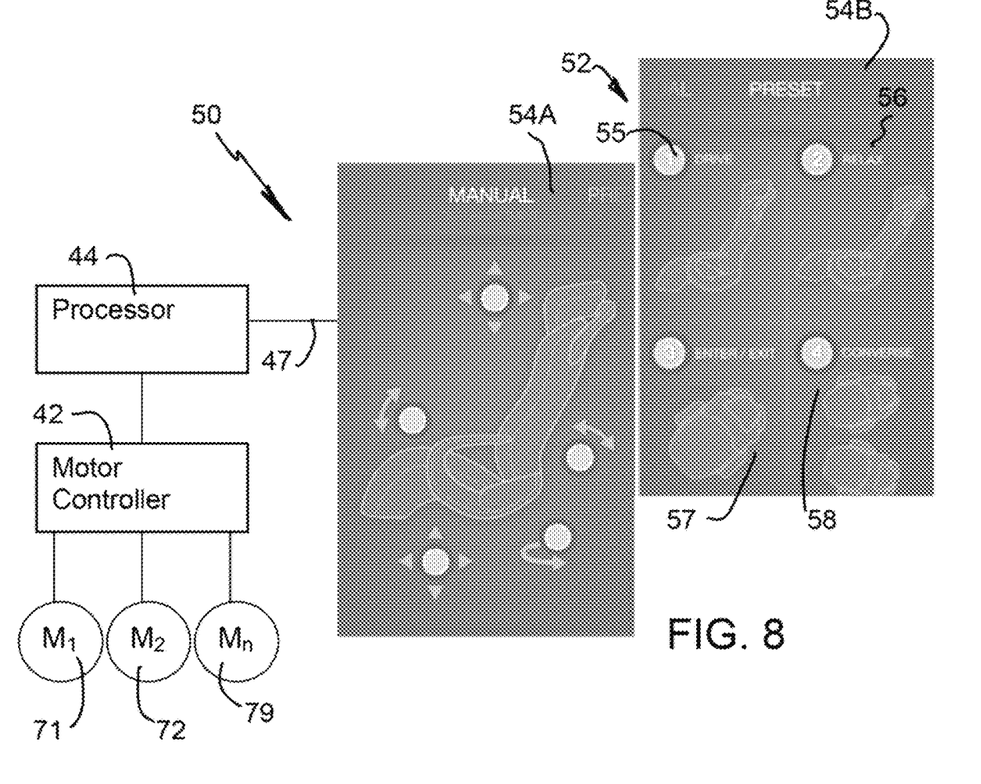
FIG. 8 is a schematic view of a seat positioning system of the vehicle seat.

As shown in FIG. 8, the position system 50 includes an actuator 52 with an actuator human interface shown as active interface 54A and 54 B. The actuator 52 comprises a touch display built into the armrest 20. This provides screens with softkeys or regions of touch activation using one or more fingers with various finger movements. The interface 52 may have an electrical (data/power) connection which extends through the intermediate portion of the armrest 29 and lower portion 28 to an electrical connection near the recline pivot 18. Features of the interface 52 are described in further detail in related U.S. patent application Ser. No. 15/846,733 entitled RETRACTING SEAT CONTROL INTERFACE, (U.S. application Ser. No. 15/846,733 is incorporated herein by reference in its entirety). The actuator 52 with actuator interface or control interface 54A, 54B may be operatively connected via actuator to processor connection 47 to a processor 44 or the like. The processor 44 both controls the display content of the interface 54A, 54B and also receives signals from the interface to control the motors 71($M_1$), 72($M_2$), ... 79($M_n$) via motor controller 42. The processor connection 47, the processor 44 and the motor controller present just one example of an operative connection between the actuator and the plurality of drive motors.

Interface 54A provides a screen for a manual mode, wherein each position adjustment may be selected, including rotation of the vehicle seat 10. The interface 54A allows the occupant to select a changeover to the interface 54B. The interface 54B allows a selection of preset movements to preset positions. In particular, sequenced sets of specified seat movements via movement actuators 55, 56, 57 and 58 are provided that rotate and position the vehicle seat 10 for getting in and out of the vehicle 8 easier (movement actuator 57). Other predefined movements to specific positions are provided by the various movement actuators 55, 56, 57 and 58. These predefined movements to specific positions may be modified for particular users, such that the final position or even intermediate positions are customized by the occupants to provide the preference of the occupant.

Figure 9:
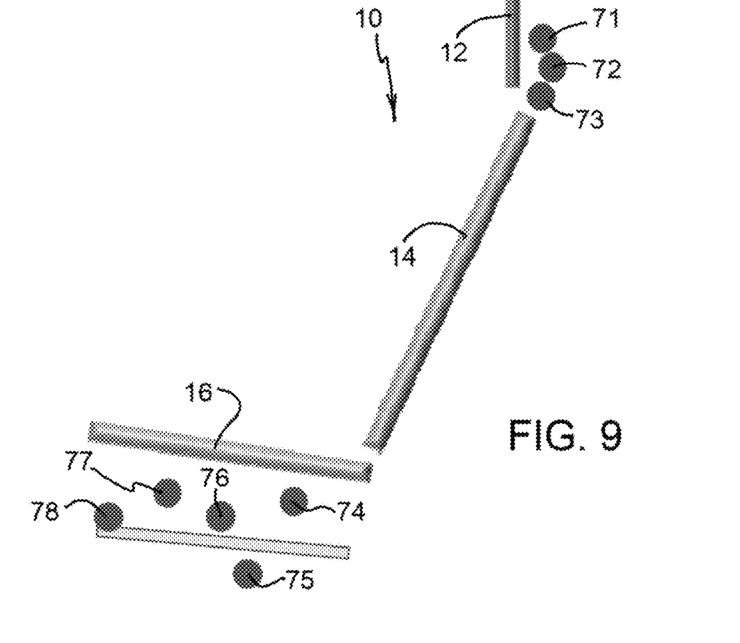
FIG. 9 is a schematic view of the vehicle seat including various position adjustment motors.
Figure 10A:
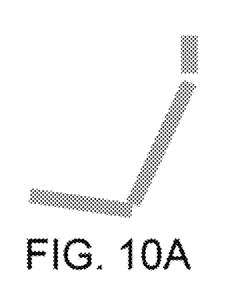
FIG. 10A is schematic view showing seat position aspects of a seat design position for a first memory mode.
Figure 10B:
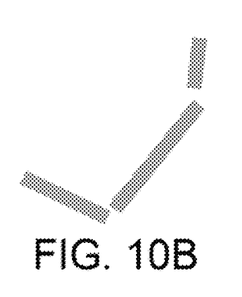
FIG. 10B is schematic view showing seat position aspects of a relax-deep recline position for a second memory mode.
Figure 10C:
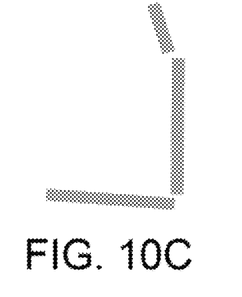
FIG. 10C is schematic view showing seat position aspects of a stow position for a third memory mode.
Figure 10D:
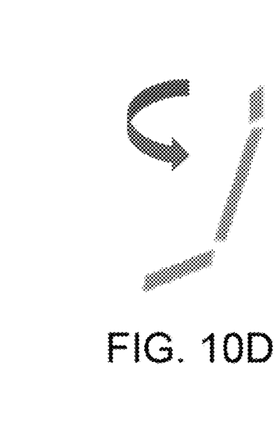
FIG. 10D is schematic view showing seat position aspects of an enter/exit-ingress/egress position for a fourth memory mode.
Figure 10E:
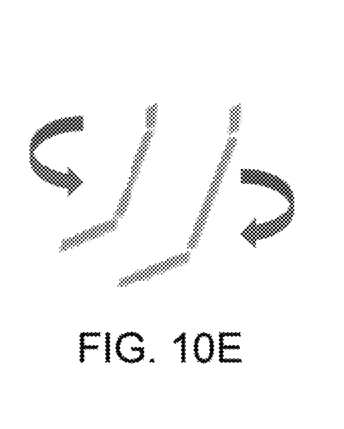
FIG. 10E is schematic view showing seat position aspects of a converse position for a fifth memory mode.

The vehicle seat 10 advantageously includes a plurality of motors 71-79, each for effecting a different positional change. As schematically shown in FIG. 9, the vehicle seat 10 includes a position adjustment motor 71, a Z/height position adjustment motor 72 and a tilt angle adjustment motor 73 for the headrest assembly 12. Additionally, a recline motor 74, a swivel (z-axis rotation) motor 75, a four-aft track motor 76, a seat base tilt angle motor 77 and a lift (up down) motor 78 are provided. The interface panel 52 may be used to select the pre-memorized seat position modes. This may be based on the vehicle seat 10 having a memorized design position (FIG. 10A) with positioning ranges. This may be a design position at a design tilt of 25 degrees, including: a lift range—down 3.8 mm up 44 mm; a recline range—rearward 20 degrees upright 10 degrees; a track range—rearward 50 mm forward 160 mm; travel rotation—15 degrees in an inboard direction and 70 degrees in an outboard direction; and with headrest travel from a design position 40 mm up 50 mm forward. FIG. 10B shows a second memorized position—a deep recline position. This has the tilt full up, a lift in any position, a recline of 50°, any track position, a rotation angle of zero (forward) and with the headrest forward. FIG. 10C shows a memorized stow position with the tilt full down, the lift full down, the recline full forward, the track full forward, the rotation at full forward and the headrest in the design position. FIG. 10E shows an ingress/egress memory position which is actuated from any initial position to rotate the vehicle seat 10 to a position with the tilt full down, the lift in the design position. The end ingress/egress position has the recline angle at the design position, the track full forward, the rotation at 70° in the outbound direction, and the headrest in the design position. FIG. 10E shows a conversation memory position in which seats are rotated towards each other. For example, the right outbound seat is turned in an inbound direction and the left outbound seat is turned in an inbound direction to slightly face each other. This may be for example based on each vehicle seat rotating 15° in an inbound direction. Preferably each of the adjustments such as manual adjustments and preset movements and repositionings are provided by an occupant using the touchscreen at the interface panel 52.

Although not shown, a further interface screen with other softkeys may be provided. This further interface screen, or one of the interfaces 54A, 54B, may only comprise customized presets. Further, other features such as sensors or state signals from the vehicle 8 may change the position of the vehicle seat 10 or bring about movement of the vehicle seat 10. For example, opening any one of the particular doors may be programmed (pre-set) to result in the processor 24 sending signals to the motor controller 42 of any of the particular vehicle seats 10, 11 etc., to position the vehicle seat for ingress. The seat 10 in this case greets the occupant with the occupant's own personal pre-sets. Further, some other sensors or input of the vehicle 8 may reposition the vehicle seat 10. This could for example be a repositioning wherein the driver must take over control of the vehicle 8 from the autonomous driving system of the vehicle 8.

The interface of the actuator 52 is not restricted to the interface 54A and 54B as shown and described above. Instead, the processor may be connected via the actuator to processor connection 47 to a Bluetooth, Wi-Fi, or other wireless or network interface. In this case, the actuator 52 could for example be an application on a smart phone. Further, information about the identity of the occupant may be entered at some other interface of the vehicle 8. The seat 10, that the identified occupant sits in or is to sit in, will move to various positions in a defined way. The interface may be a microphone with voice recognition processing at the processor to provide a voice activated change in position and/or a voice activated assignment of the seat to a particular identified occupant with prior saved preferences and sequenced movements. The particular voice of the occupant may also be matched to a data base or otherwise recognized to identify the occupant.

Figure 11:
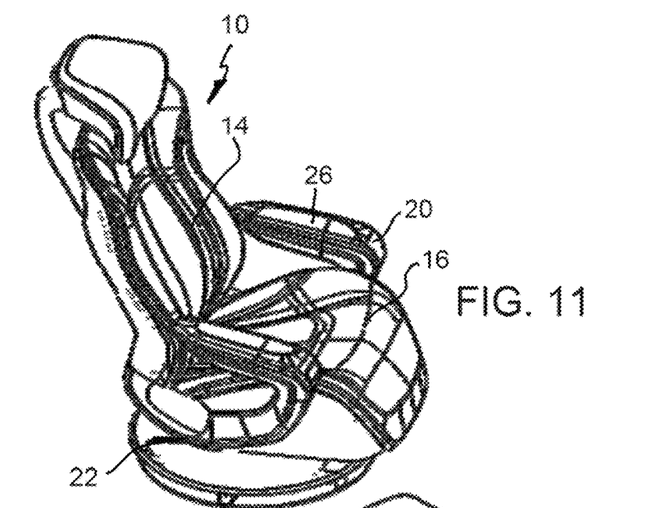
FIG. 11 is a perspective view showing the vehicle seat in a first position of a sequenced set of specified seat movements including rotation and other seat position adjustments.
Figures 12, 13:
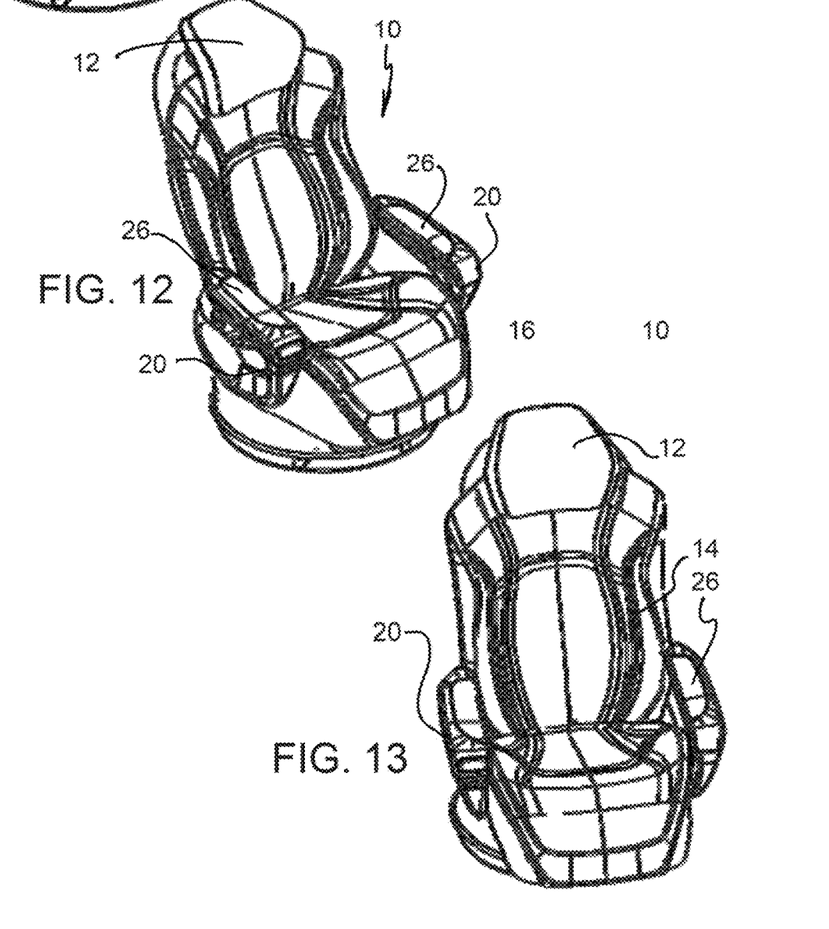
FIG. 12 is a perspective view showing the vehicle seat in another position of the sequenced set of specified seat movements.
FIG. 13 is a perspective view showing the vehicle seat in another position of the sequenced set of specified seat movements.

FIGS. 11, 12 and 13 show a potential series or sequence of movements of the vehicle seat 10 as the vehicle seat 10 moves from an initial position (FIG. 11) to an ingress/egress position (FIG. 13). During this motion, besides rotational movement, the seatback 14 and the armrest 20 may also move. Further, the seat base 16 may be moved by changing the angular position of the seat base 16. The headrest may move based on power drives as well. FIG. 12 shows an intermediate position during the motion from the initial position to the ingress/egress position.

Figure 14:
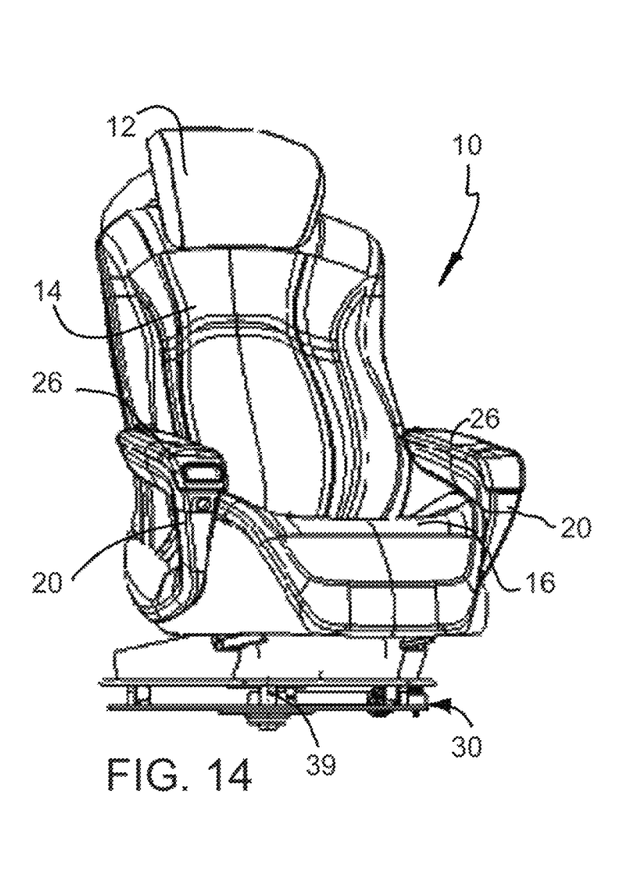
FIG. 14 is a perspective view showing the vehicle seat in another position of the sequenced set of specified seat movements.

FIG. 14 shows a potential ingress and egress position which is initially provided for a user. FIG. 15 shows the vehicle seat 10 slightly repositioned relative to the position of the vehicle seat 10 in FIG. 14. In particular, the user or occupant may set the end position to the user's/occupant's preferences. This may include a slight change in the rotational position as shown in FIG. 15 but also may include changes in the position of the seatback 14 and the armrest 20.

While specific embodiments of the invention have been shown and described in detail to illustrate the application of the principles of the invention, it will be understood that the invention may be embodied otherwise without departing from such principles.

APPENDIX

LIST OF REFERENCE CHARACTERS

| | |
|---|---|
| 2 | vehicle floor |
| 4 | direction of travel |
| 5 | horizontal |
| 6 | windshield frame |
| 8 | vehicle |
| 10 | vehicle seat |
| 12 | headrest assembly |
| 13 | headrest support |
| 14 | seatback |
| 16 | seat base (cushion) |
| 18 | seatback recline pivot |
| 20 | armrests |
| 22 | pivot connection |
| 23 | armrest upper portion |
| 24 | seatback connection |
| 25 | armrest upper rear end |
| 26 | armrest upper surface |
| 27 | armrest upper forward end |
| 28 | armrest lower portion |
| 29 | joining portion |
| 30 | rotational connection |
| 32 | track openings |
| 34 | subfloor |
| 36 | supports |
| 39 | rotational axis |
| 40 | drive motors |
| 41 | full up armrest angle |
| 42 | design armrest angle |
| 43 | full recline armrest angle |

APPENDIX-continued

LIST OF REFERENCE CHARACTERS

| | |
|---|---|
| 44 | processor |
| 47 | actuator to processor connection |
| 50 | positioning system |
| 52 | actuator |
| 54a | actuator interface |
| 54b | actuator interface |
| 55 | movement actuator |
| 56 | movement actuator |
| 57 | movement actuator |
| 58 | movement actuator |
| 71 | headrest X position adjustment motor |
| 72 | headrest Z position adjustment motor |
| 73 | headrest tilt angle adjustment motor |
| 74 | recline motor |
| 75 | swivel (z-axis rotation) motor |
| 76 | four-aft track motor |
| 77 | seat base tilt angle motor |
| 78 | lift (up down) motor |
| 79 | nth motor or armrest pivot motor |

What is claimed is:

1. A vehicle seat comprising:
a seat base;
a seatback;
a seatback recline pivot pivotably supporting the seatback relative to the seat base for pivoting movement of the seatback relative to the seat base about the seatback recline pivot, between a full upright position and a full recline position;
an armrest having an upper armrest upper surface;
an armrest to seatback recline pivot connection pivotably connecting the armrest to the seatback recline pivot for pivoting movement of the armrest relative to the seat base about the seatback recline pivot, between an armrest full upright position and an armrest full recline position; and an armrest to seatback connection fixing said armrest relative to said seatback wherein said armrest pivots with said seatback and the armrest upper surface is positioned at a design position armrest angle of from 10° to 0° below horizontal, with said seatback in a seatback design position between the seatback full upright position and the full recline position.

2. A vehicle seat according to claim 1, wherein the armrest upper surface is positioned at a full recline armrest angle of from 0° and 20° above horizontal, with said seatback in the full recline position.

3. A vehicle seat according to claim 1, wherein the armrest upper surface is positioned at a full upright armrest angle of from 5° and 25° below horizontal, with said seatback in the full upright position.

4. A vehicle seat according to claim 1, further comprising a headrest assembly comprising a headrest and supports connected to a rear facing portion of the backrest.

5. A vehicle seat according to claim 1, further comprising: a rotational connection of the seat base with a vehicle floor; and a rotational drive for rotating the vehicle seat relative to the seat.

6. A vehicle seat according to claim 5, further comprising: a positioning system comprising an actuator, a plurality of motors and an operative connection between the actuator and the plurality of drive motors, the plurality of motors comprising said rotational drive and one seatback pivot drive for changing a pivot angle of said seatback between the seatback full upright position and the full recline position.

7. A vehicle seat according to claim 6, wherein the plurality of drive motors further comprise a seat base position adjustment drive adjusting a position of the seat base.

8. A vehicle seat according to claim 6, wherein the actuator further comprises an actuator interface connected to the armrest.

9. A vehicle seat according to claim 6, wherein the actuator further comprises an actuator interface provided as a computer application on a computer or mobile device and connected to the drive motors via said operative connection.

10. A vehicle seat according to claim 6, wherein said positioning system establishes and executes a sequenced set of specified seat movements that rotate and position the seat to predefined positions based on movements of a plurality of drive motors including said rotational drive.

11. A vehicle seat according to claim 1, wherein said armrest comprises an armrest upper portion with an armrest upper rear end, said armrest extending from said armrest upper rear end to an armrest upper forward end, wherein said upper armrest surface is defined by said armrest upper portion between said armrest upper rear end and said armrest upper forward end, and said armrest comprises an armrest lower portion having an armrest lower rear end, with said armrest to seatback recline pivot connection and said armrest to seatback connection at said armrest lower rear end, and said armrest comprises a joining portion, joining said armrest upper portion with said armrest lower portion.

12. A vehicle seatback and armrest assembly according to claim 11, further comprising a second armrest to seatback connection fixing the armrest to the seatback at a connection location, which said connection location is spaced from said armrest to seatback recline pivot connection, whereby the armrest is fixed to the seatback at said armrest to seatback connection and at said second armrest to seatback connection.

13. A vehicle seat according to claim 12, wherein said second armrest to seatback connection location is at said armrest upper rear end.

14. A vehicle seat comprising: a seat base; a seatback; a seatback recline pivot pivotably supporting the seatback relative to the seat base for pivoting movement of the seatback relative to the seat base about the seatback recline pivot, between a full upright position and a full recline position; an armrest having an upper armrest upper surface; an armrest to seatback recline pivot connection pivotably connecting the armrest to the seatback recline pivot for pivoting movement of the armrest relative to the seat base about the seatback recline pivot, between an armrest full upright position and an armrest full recline position, wherein said armrest comprises an armrest upper portion with an armrest upper rear end, said armrest extending from said armrest upper rear end to an armrest upper forward end, wherein said upper armrest surface is defined by said armrest upper portion between said armrest upper rear end and said armrest upper forward end, and said armrest comprises an armrest lower portion having an armrest lower rear end, with said armrest to seatback recline pivot connection at said armrest lower rear end, and said armrest comprises a joining portion, joining said armrest upper portion with said armrest lower portion.

15. A vehicle seat according to claim 14, further comprising: a rotational connection of the seat base with a vehicle floor; a rotational drive for rotating the vehicle seat relative to the seat; and a positioning system comprising an actuator, a plurality of motors and an operative connection between the actuator and the plurality of drive motors, the plurality of motors comprising said rotational drive and one seatback pivot drive for changing a pivot angle of said seatback between the seatback full upright position and the full recline position, wherein said armrest pivots independently of said seatback to position the armrest upper surface at armrest angle of from 0° and 20° above horizontal and from 0° to 25° below horizontal.

16. A vehicle seat according to claim 15, wherein said plurality of motors further comprises armrest pivot drive to pivot the armrest about the seatback recline pivot to select an angular position of the armrest surface of the armrest.

17. A vehicle seat according to claim 14, wherein said armrest to seatback recline pivot connection connects said armrest to said seatback recline pivot and said armrest pivots independently of said seatback to position the armrest upper surface at armrest angle of from 0° and 20° above horizontal and from 0° to 25° below horizontal.

18. A vehicle seat according to claim 14, further comprising an armrest to seatback connection fixing said armrest relative to said seatback wherein said armrest pivots with said seatback.

19. A vehicle seatback and armrest assembly according to claim 18, further comprising second armrest to seatback connection, wherein:
- said second armrest to seatback connection fixes said armrest to said seatback at a connection location;
- said armrest to seatback connection is at said armrest lower rear end; and
- said connection location is spaced from said armrest lower rear end whereby said armrest is fixed to the seatback both at said armrest to seatback connection and at said second armrest to seatback connection.

\* \* \* \* \*